Nov. 2, 1937.  S. SEITNER  2,097,577
SINGLE PHASE ALTERNATING CURRENT MOTOR
Filed Sept. 19, 1936
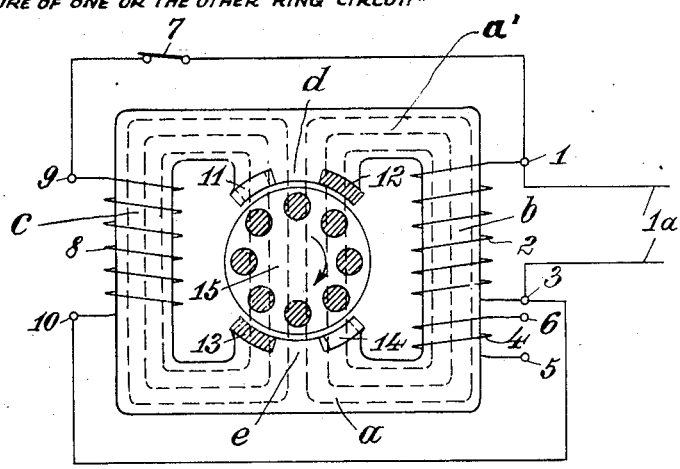
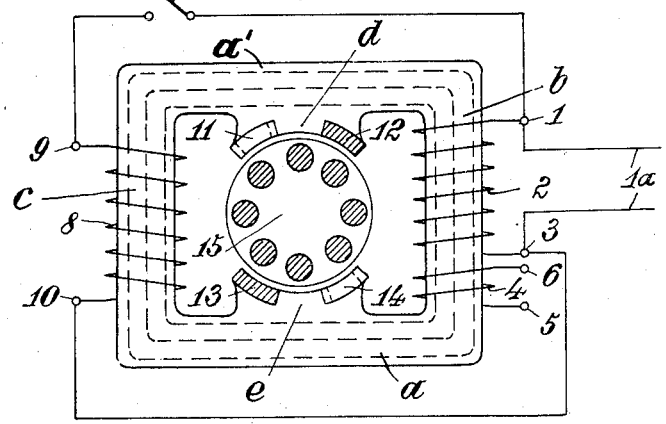
Inventor:
Sebastian Seitner,
by Carl A. Hellmann
Attorney.

Patented Nov. 2, 1937

2,097,577

UNITED STATES PATENT OFFICE 2,097,577

SINGLE PHASE ALTERNATING CURRENT MOTOR

Sebastian Seitner, Alzey, Germany, assignor to firm: Markes & Co., Gesellschaft mit beschrankter Haftung, Ludenscheid, Germany Application September 19, 1936, Serial No. 101,653
In Germany April 3, 1934

1 Claim. (Cl. 172—275)

This invention relates to improvements in single phase alternating current motors which comprise an additional secondary winding for uninterruptedly supplying consumers with current of reduced voltage.

It is known that small consumers can be supplied with current of a reduced voltage compared with the voltage of the supply mains by using, instead of a transformer, a current supply obtained from a separate additional winding of an electric motor.

The present invention relates to a motor, the rotor of which can be stopped while at the same time maintaining the current supply to small consumers. According to the invention a single phase alternating current motor having, according to the divided pole principle, short-circuitable rings or pole shading windings on its poles for determining and/or reversing the direction of rotation and having stators which carry at least two differentially connected exciting windings for alternating current arranged on different yoke-sides but adjacent to the same pole, is provided with an additional secondary winding which is arranged on one of the pole arms, the rotor capable of being arrested while nevertheless maintaining the current supplied by the secondary winding, by disconnecting one of the exciting coils or one of the groups of exciting coils.

A motor constructed according to the invention can thus be used either as a squirrel cage motor or as a transformer or, if desired, for both purposes simultaneously. These advantages entail a useful and economical application of the motor for driving machinery, which has to rotate in either sense and where by dint of the available switches the low tension current produced can be used at the same time for the illumination of moist premises or premises containing inflammable material, as low tension currents are not dangerous to human life. Similar conditions arise in driving the machining used for bakeries or for the manufacture of confectionery, where the switch arrangement makes possible the optional use of the low tension current for the illumination of the ovens. In this case the motor having a short circuited rotor offers the combination of a source of power and a transformer which provides current of a safe voltage. This combination also increases the total efficiency of such an installation, because only a single magnetizing current is required. The power factor of the motor is thus improved and the low tension current can be used without substantially increasing the total current taken by the machine.

The invention will be more readily understood by means of the accompanying drawing, in which:

Figure 1 shows the circuit diagram of a machine for single phase alternating current with a short-circuited rotor when used simultaneously as a driving motor and as a transformer. Fig. 2 is a diagram of the machine when the rotor is at rest and the machine is operating solely as a transformer.

Referring first to Fig. 1 the following will make the invention clear. The current supplied by the mains *1a* flows to the terminals *1* and *3* and thus simultaneously to the coil *2* and through switch *7* and terminals *9* and *10* to the coil *8*. The two coils produce magnetic fluxes in opposite directions in the magnetic core *b, a, a', c* which meet at the pole-pieces *d* and *e* and flow through the rotor *15*.

A switch *7* is provided whereby the rotor can be stopped and started. If, as shown in Fig. 2, switch *7* is opened, the current passes at terminal *1* into coil *2* and flows through terminal *3* back to the supply mains. The magneto-motive force then produced between the poles *d* and *e* is too feeble to cause any great flux to pass through the rotor, where in addition the air gaps between the pole-pieces and the rotor *15* offer additional magnetic reluctance, and most of the said field flux thus follows the outer path *b, a, c, a'*. A current is induced in the additional coil *4* both when the rotor is at rest and when it is running, the low tension of the said coil corresponding to the number of turns used. As a result of this arrangement the stator acts as a transformer. The low tension current is taken off at the terminals *5* and *6*. It is not influenced by operating the switch *7*.

At the pole-pieces the magnetic fluxes are displaced in respect of their phase in known manner by means of pole-shading conductors or short-circuitable rings, the resultant lagging flux of which produces the rotation of the armature. The pole-pieces may be imagined to consist of three parts. The pole-shading coils or rings *11, 12, 13* and *14* are arranged on the exterior. The said pairs of coils or rings which are respectively displaced by 180°, for instance *11* and *14* or *12* and *13*, may be short-circuited as desired and the rotor is thus driven clockwise or counterclockwise.

This control and mode of connection can be applied also to multipolar machinery.

The operation of the machine is believed to be clear from the above description, but it may be briefly summarized as follows:

Current supplied from the mains *1a* to the stator coils 2 and 8 in parallel will traverse these coils in such direction as to produce opposing alternating fluxes in the legs b and c of the yoke or core, which will thus produce resultant poles in the arms a and a' of the yoke at e and d, respectively, where such fluxes must traverse the rotor 15 and the surrounding air gaps. Due to the short-circuitable rings 12, 13 or 11, 14, whichever pair is short-circuited, the rotor will be set into rotation due to the phase displacements produced by the shaded portions of the respective pole pieces. It is thus possible to cause the rotor to turn either clockwise or counterclockwise by short-circuiting the corresponding rings.

However, when the switch 7 is opened, power is no longer supplied to the winding 8, while winding 2 continues to receive such power. Since there is thus no opposing magneto-motive force produced by the winding 8, the flux produced by the winding 2 has a path of low magnetic reluctance provided by the yoke or core b, a, c, a'. Since this path has no air gaps therein its reluctance is much lower than the parallel path, through the rotor and the two air gaps in series with the rotor, so that only a negligible amount of flux will flow through the rotor when the coil 8 is not energized, this small leakage flux being insufficient to operate the rotor.

However, in either case, that is, whether the main flux is produced by coil 2 alone or by coils 2 and 8 jointly, the yoke arm b upon which are located windings 2 and 4 will always constitute a transformer wherein coil 2 is the primary winding and coil 4 the secondary winding, so that regardless of whether or not the device is also operating as a motor, the transformer action dependent solely upon the core b and the windings 2 and 4 will not be materially affected and the coil 4 will, therefore, at all times, deliver a supply of alternating current at substantially constant reduced potential, derived from the power supplied to the coil 2.

The present invention may conveniently be used also in connection with toy-cinematographic apparatus as well as for toy-railways provided with light, electrically driven toy motor cars provided with light, and similar toys.

What I claim and desire to secure by Letters Patent in the United States is:

Single phase alternating current motor of the split pole type with a short-circuited rotor, comprising, a stator having at least two yoke-sides and intermediate field poles, at least two pairs of short-circuitable rings on the poles for reversing the direction of rotation, at least two exciting windings for alterating current electrically in parallel and in opposing flux connection on different yoke-sides adjacent to the same stator pole, an additional secondary winding for supplying external consumers with reduced tension current on one yoke-side and means for separately disconnecting the exciting winding arranged on the other yoke-side to stop the rotor while maintaining the same reduced voltage at the secondary winding as during the running of the rotor.

SEBASTIAN SEITNER.